United States Patent
Fujimaki et al.

(10) Patent No.: US 11,505,188 B2
(45) Date of Patent: Nov. 22, 2022

(54) VEHICLE SPEED CONTROL DEVICE AND VEHICLE SPEED CONTROL METHOD

(71) Applicant: ISUZU MOTORS LIMITED, Tokyo (JP)

(72) Inventors: Yuta Fujimaki, Fujisawa (JP); Takahiro Sato, Fujisawa (JP); Ryota Okeya, Fujisawa (JP)

(73) Assignee: ISUZU MOTORS LIMITED, Tokyo (JP)

(*) Notice: Subject to any disclaimer, the term of this patent is extended or adjusted under 35 U.S.C. 154(b) by 261 days.

(21) Appl. No.: 16/753,723

(22) PCT Filed: Oct. 4, 2018

(86) PCT No.: PCT/JP2018/037214
§ 371 (c)(1),
(2) Date: Apr. 3, 2020

(87) PCT Pub. No.: WO2019/070026
PCT Pub. Date: Apr. 11, 2019

(65) Prior Publication Data
US 2021/0362713 A1    Nov. 25, 2021

(30) Foreign Application Priority Data

Oct. 5, 2017    (JP) .............................. JP2017-195471

(51) Int. Cl.
*B60W 30/12*    (2020.01)
*B60W 30/14*    (2006.01)
(Continued)

(52) U.S. Cl.
CPC .......... *B60W 30/143* (2013.01); *B60W 10/04* (2013.01); *B60W 30/16* (2013.01);
(Continued)

(58) Field of Classification Search
None
See application file for complete search history.

(56) References Cited

U.S. PATENT DOCUMENTS

| | | | |
|---|---|---|---|
| 7,363,140 B2 * | 4/2008 | Ewerhart | B60W 30/143 701/96 |
| 8,457,827 B1 * | 6/2013 | Ferguson | B60W 30/16 701/28 |

(Continued)

FOREIGN PATENT DOCUMENTS

| | | |
|---|---|---|
| CN | 105172792 A | 12/2015 |
| CN | 105216794 A | 1/2016 |

(Continued)

OTHER PUBLICATIONS

International Search Report and Written Opinion for related PCT App No. PCT/JP2018/037214 dated Dec. 4, 2018, 8 pgs.

(Continued)

*Primary Examiner* — Jonathan M Dager
(74) *Attorney, Agent, or Firm* — Procopio, Cory, Hargreaves & Savitch LLP

(57) ABSTRACT

A vehicle speed control device 1 mounted in a vehicle comprises: a forward detection unit 121 that obtains the amount of time until a vehicle $V_b$ to be overtaken that is traveling to the side of a host vehicle $V_a$, in which the vehicle speed device 1 is mounted, is overtaken; a rearward detection unit 122 that obtains the amount of time until the distance between the host vehicle $V_a$ and a following vehicle $V_c$ traveling rearward of the host vehicle $V_a$ reaches a prescribed rearward distance; and a speed control unit 123 that increases the speed of the host vehicle $V_a$ when the time until overtaking occurs is greater than the time until the prescribed rearward distance is reached.

9 Claims, 5 Drawing Sheets

(51) Int. Cl.
    *B60W 10/04*     (2006.01)
    *B60W 30/16*     (2020.01)
    *B60W 30/18*     (2012.01)
(52) U.S. Cl.
    CPC ... *B60W 30/18163* (2013.01); *B60W 2520/10* (2013.01); *B60W 2554/4041* (2020.02); *B60W 2554/802* (2020.02); *B60W 2554/804* (2020.02); *B60W 2720/125* (2013.01)

(56) References Cited

U.S. PATENT DOCUMENTS

| | | | | |
|---|---|---|---|---|
| 9,902,395 | B2* | 2/2018 | Miura | B60W 30/18 |
| 9,925,873 | B2* | 3/2018 | Takano | G08G 1/16 |
| 9,956,956 | B2* | 5/2018 | Ali | B60W 50/085 |
| 10,464,560 | B2* | 11/2019 | Sato | B60W 40/04 |
| 10,627,813 | B2* | 4/2020 | Tsuji | B60W 10/06 |
| 10,870,426 | B2* | 12/2020 | Rachor | B60W 30/18163 |
| 11,084,490 | B2* | 8/2021 | Kim | B60W 30/12 |
| 2009/0088925 | A1* | 4/2009 | Sugawara | B60W 30/12 340/436 |
| 2009/0265107 | A1 | 10/2009 | Matsno | |
| 2010/0042282 | A1* | 2/2010 | Taguchi | G08G 1/161 701/25 |
| 2012/0296522 | A1* | 11/2012 | Otuka | B60W 30/12 701/41 |
| 2014/0074356 | A1* | 3/2014 | Bone | B62D 15/0255 701/41 |
| 2015/0154458 | A1* | 6/2015 | Lee | G06V 20/588 348/118 |
| 2015/0166062 | A1* | 6/2015 | Johnson | B60W 10/20 701/41 |
| 2015/0360684 | A1 | 12/2015 | Matsuno et al. | |
| 2015/0367854 | A1 | 12/2015 | Ezoe et al. | |
| 2016/0091315 | A1* | 3/2016 | Oguri | G01C 21/165 701/408 |
| 2016/0091897 | A1* | 3/2016 | Nilsson | B60W 40/04 701/25 |
| 2016/0129919 | A1 | 5/2016 | Kubo | |
| 2016/0264047 | A1* | 9/2016 | Patel | G06V 20/58 |
| 2016/0272204 | A1 | 9/2016 | Takahashi et al. | |
| 2016/0297447 | A1* | 10/2016 | Suzuki | B60W 30/16 |
| 2017/0243491 | A1* | 8/2017 | Fujii | G08G 1/167 |
| 2017/0291603 | A1* | 10/2017 | Nakamura | B60W 30/095 |
| 2017/0334460 | A1* | 11/2017 | Arakawa | B60W 50/14 |
| 2017/0349172 | A1* | 12/2017 | Kubota | B60W 30/18163 |
| 2017/0349212 | A1* | 12/2017 | Oshida | G01L 5/221 |
| 2018/0029604 | A1* | 2/2018 | Niino | B60W 30/00 |
| 2018/0091085 | A1* | 3/2018 | Tamagaki | B60W 30/06 |
| 2018/0111628 | A1* | 4/2018 | Tamagaki | B60W 50/12 |
| 2018/0154939 | A1* | 6/2018 | Aoki | B62D 15/025 |
| 2018/0222422 | A1* | 8/2018 | Takae | G08G 1/166 |
| 2018/0281788 | A1* | 10/2018 | Uchida | B60W 40/09 |
| 2018/0345960 | A1* | 12/2018 | Fujii | B60W 30/0953 |
| 2018/0370544 | A1* | 12/2018 | Kitagawa | B60W 30/18163 |
| 2019/0202450 | A1* | 7/2019 | Maeda | B60W 10/04 |
| 2019/0213877 | A1* | 7/2019 | Schneider | G08G 1/164 |
| 2019/0235504 | A1* | 8/2019 | Carter | G06T 7/73 |
| 2019/0279507 | A1* | 9/2019 | Ishisaka | G08G 1/16 |
| 2019/0283757 | A1* | 9/2019 | Honda | G05D 1/0212 |
| 2019/0308617 | A1* | 10/2019 | Groult | B60Q 1/50 |
| 2020/0180638 | A1* | 6/2020 | Kanoh | B60W 30/095 |
| 2020/0269880 | A1* | 8/2020 | Tokita | G06V 20/588 |
| 2020/0301431 | A1* | 9/2020 | Matsubara | B60W 30/095 |
| 2020/0307634 | A1* | 10/2020 | Yashiro | B60W 60/0018 |
| 2020/0312155 | A1* | 10/2020 | Kelkar | B60W 60/005 |

FOREIGN PATENT DOCUMENTS

| | | |
|---|---|---|
| CN | 105518762 A | 4/2016 |
| DE | 102009017431 A1 | 10/2009 |
| DE | 102014013544 A1 | 4/2015 |
| DE | 102016104548 A1 | 9/2016 |
| JP | H05159198 A | 6/1993 |
| JP | 2008-265503 A | 11/2008 |
| JP | 2011213295 A | 10/2011 |
| JP | 2014-151838 A | 8/2014 |
| JP | 2016009200 A | 1/2016 |
| JP | 2016009201 A | 1/2016 |
| JP | 2016014970 A | 1/2016 |
| JP | 2016168985 A | 9/2016 |
| JP | 2016181226 A | 10/2016 |
| JP | 2017030748 A | 2/2017 |

OTHER PUBLICATIONS

German Patent and Trademark Office, Office Action, Application No. DE 11 2018 004 439.4, dated Mar. 2, 2022, in 11 pages.
National Intellectual Property Administration of the People's Republic of China, The First Office Action, Application No. 201880064530.9, dated Sep. 2, 2022, in 12 pages.

* cited by examiner

[FIG. 1]
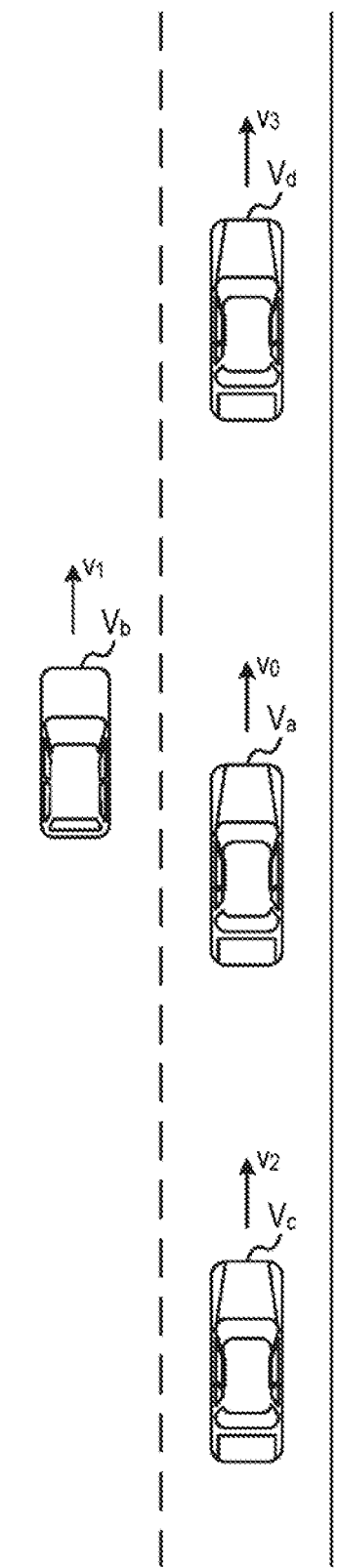

[FIG. 2]
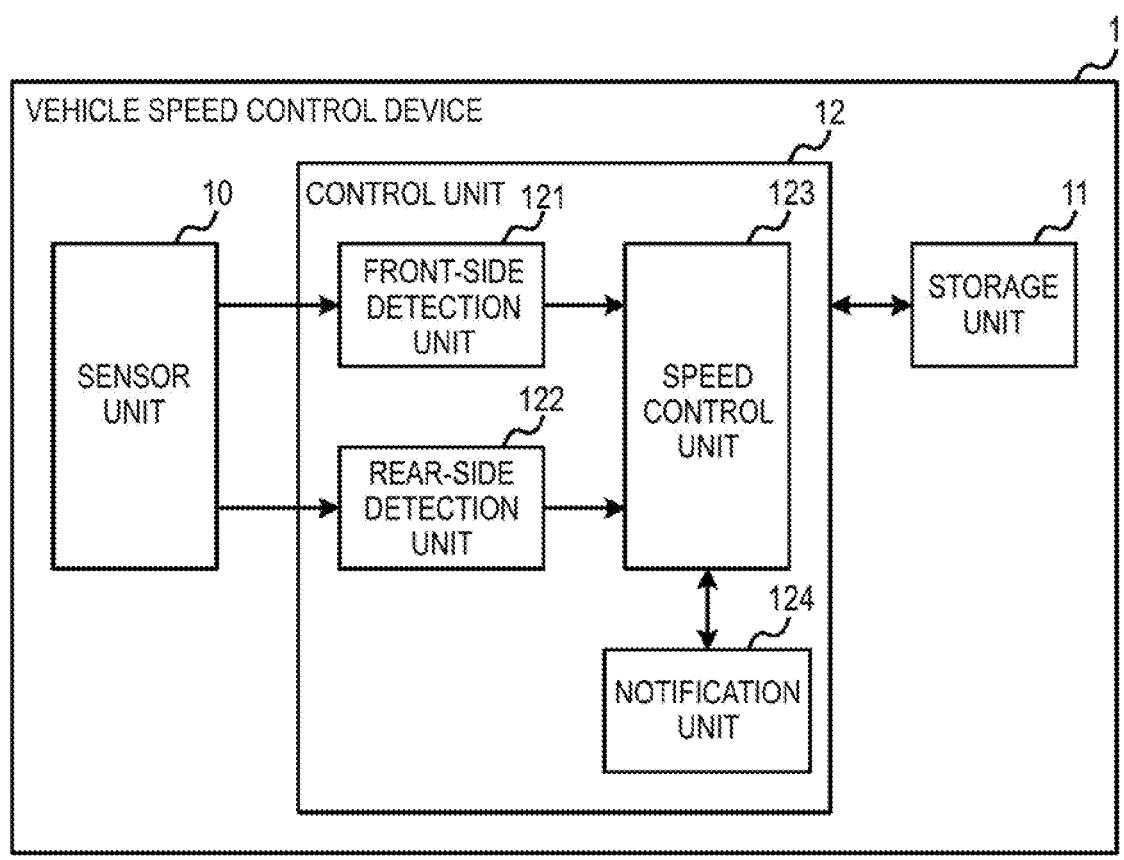

[FIG. 3A]
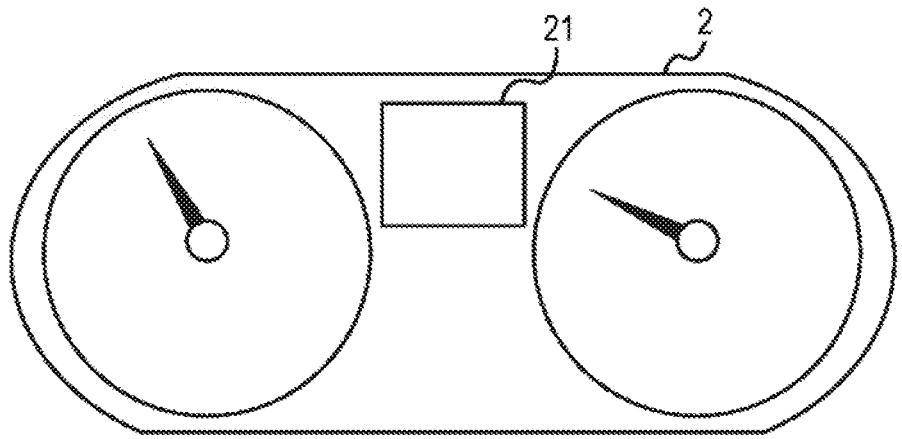
[FIG. 3B]
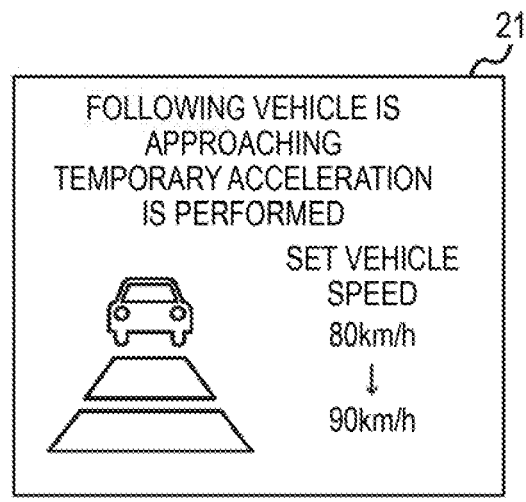
[FIG. 3C]
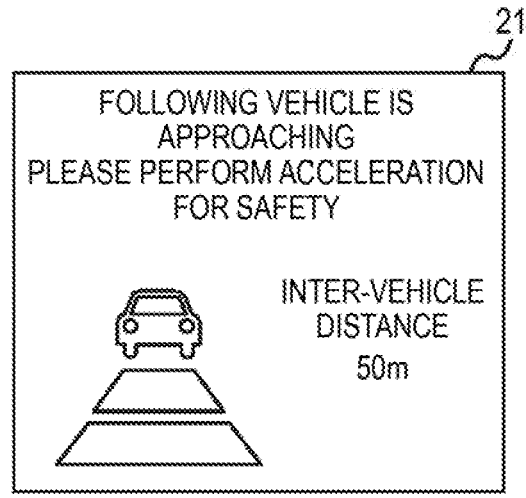

[FIG. 4]
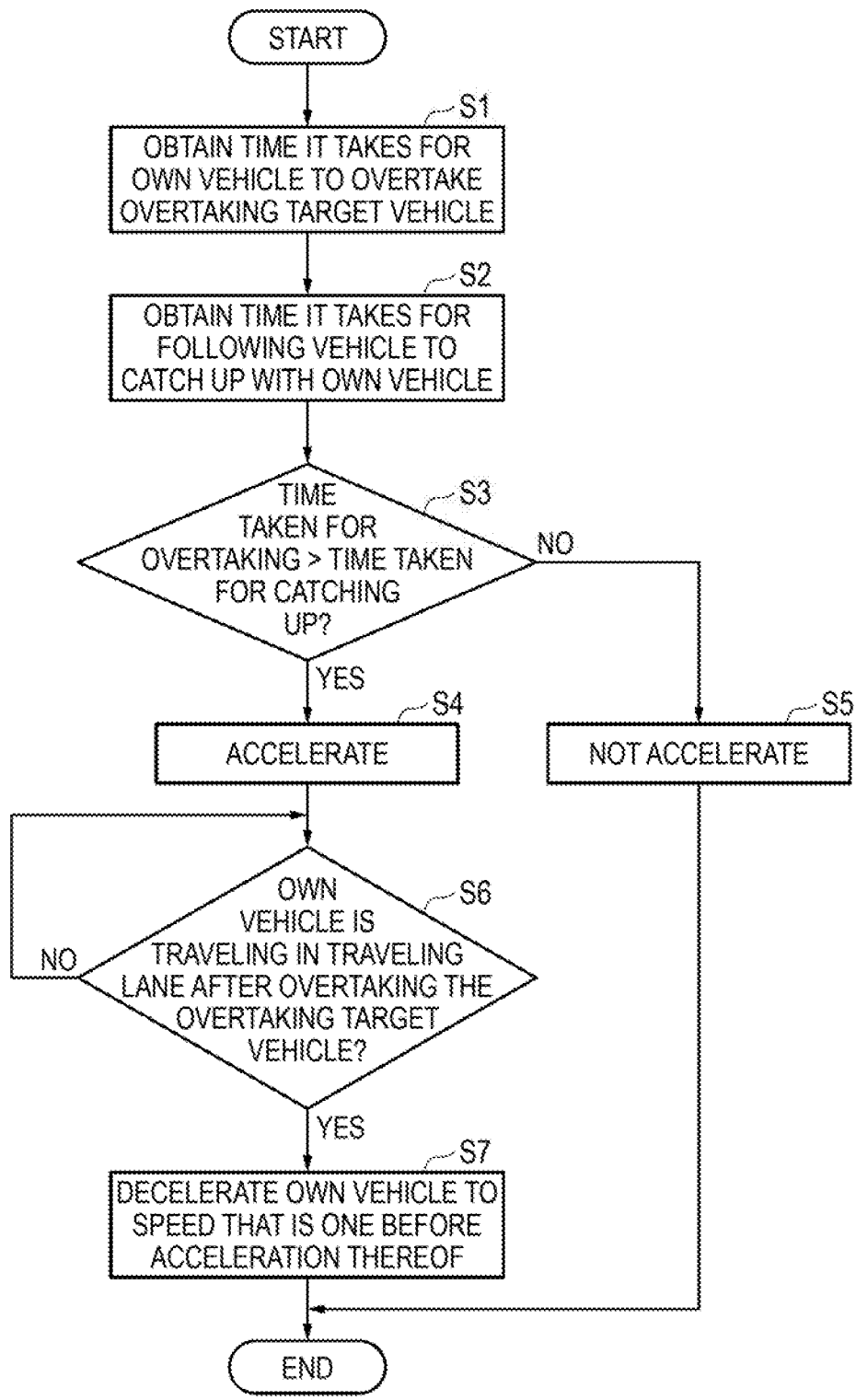

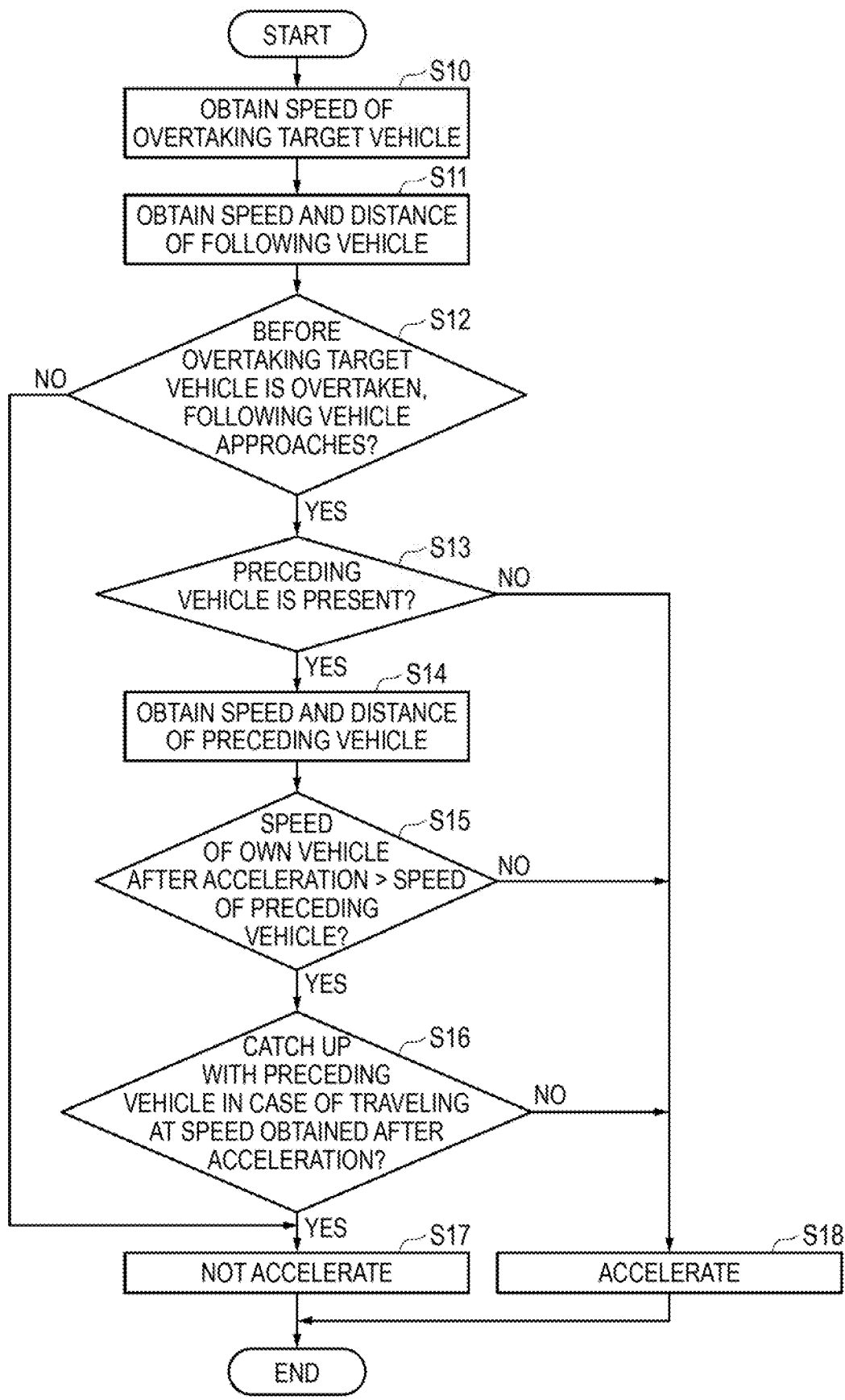

VEHICLE SPEED CONTROL DEVICE AND VEHICLE SPEED CONTROL METHOD

CROSS-REFERENCE TO RELATED APPLICATIONS

This application is a U.S. National Stage entry of PCT Application No: PCT/JP2018/037214 filed on Oct. 4, 2018, which claims priority to Japanese Patent Application No. 2017-195471, filed Oct. 5, 2017, the contents of which are incorporated herein by reference.

TECHNICAL FIELD

The present disclosure relates to a vehicle speed control device and a vehicle speed control method for controlling a speed of a vehicle.

BACKGROUND ART

There has been known a technique for automatically adjusting a speed of a vehicle for the purpose of reducing driving operation and improving safety of a driver during highway travelling. Specifically, there has been disclosed a technique of, when a lane is changed to an adjacent lane to overtake a followed preceding vehicle, temporarily changing a target inter-vehicle distance until overtaking the followed preceding vehicle before the lane change (PTL 1).

CITATION LIST

Patent Literature

PTL 1: JP-A-5-159198

SUMMARY OF INVENTION

Technical Problem

In the technique disclosed in PTL 1, in a case where a following vehicle approaches an own vehicle, the following vehicle may be caused to decelerate depending on the target inter-vehicle distance between the own vehicle and a followed preceding vehicle after the lane change.

Therefore, the present disclosure has been made in view of the above circumstances, and an object thereof is to provide a technique capable of preventing deceleration of a following vehicle at the time of overtaking an overtaking target vehicle.

Solution to Problem

A vehicle speed control device according to a first aspect of the present invention is a vehicle speed control device to be mounted on a vehicle, comprising: a front-side detection unit configured to obtain a time to overtake an overtaking target vehicle that travels on a lateral side of an own vehicle on which the vehicle speed control device is mounted; a rear-side detection unit configured to obtain a time it takes for a distance between the own vehicle and a following vehicle traveling behind the own vehicle to be a predetermined rear-side distance; and a speed control unit configured to accelerate the own vehicle in a case the time to overtake is longer than the time it takes to be the predetermined rear-side distance.

For example, the front-side detection unit obtains the time to overtake, which is determined based on a relative speed and a distance between the own vehicle and the overtaking target vehicle, and the rear-side detection unit obtains the time it takes to be the predetermined rear-side distance, which is determined based on a relative speed and the distance between the own vehicle and the following vehicle.

The vehicle speed control device may further comprise a notification unit configured to notify that the following vehicle is approaching the own vehicle, before the speed control unit accelerates the own vehicle.

The front-side detection unit may further obtain a relative speed between the own vehicle and a preceding vehicle traveling ahead of the own vehicle, and wherein the speed control unit may accelerate the own vehicle in a case a speed obtained after the own vehicle is accelerated is lower than a speed of the preceding vehicle which is determined based on the relative speed between the own vehicle and the preceding vehicle.

For example, at a speed obtained after accelerating the own device, the front-side detection unit obtains: a first time it takes for the own vehicle to overtake the overtaking target vehicle; and a second time it takes for a distance between the own vehicle and the preceding vehicle traveling ahead of the own vehicle to reach a predetermined front-side distance, and the speed control unit accelerates the own vehicle in a case the first time is shorter than the second time.

The speed control unit may decelerate the own vehicle to a speed that is one before accelerating the own vehicle, after overtaking the overtaking target vehicle.

A vehicle speed control method is a vehicle speed control method for a vehicle comprising a sensor and a control unit, the sensor comprising a first sensor configured to detect an environment ahead of the vehicle and a second sensor configured to detect an environment behind the vehicle, the method comprising causing the control unit to perform: a step of obtaining a first time to overtake an overtaking target vehicle traveling on a lateral side of an own vehicle by using the first sensor; a step of obtaining a second time it takes for a distance between the own vehicle and a following vehicle traveling behind the own vehicle to be a predetermined rear-side distance by using the second sensor; a step of determining whether the first time is longer than the second time; and a step of accelerating the own vehicle in a case it is determined that the first time is longer than the second time.

The method may further cause the control unit to perform: a step of obtaining a relative speed between the own vehicle and a preceding vehicle traveling ahead of the own vehicle by using the first sensor, a step of determining whether a speed obtained after the own vehicle is accelerated is lower than a speed of the preceding vehicle which is determined based on the relative speed between the own vehicle and the preceding vehicle; and a step of accelerating the own vehicle in a case it is determined that the speed obtained after the own vehicle is accelerated is lower than the speed of the preceding vehicle.

Advantageous Effects of Invention

According to the present disclosure, it is possible to prevent deceleration of a following vehicle when overtaking an overtaking target vehicle.

BRIEF DESCRIPTION OF DRAWINGS

FIG. 1 is a diagram for illustrating an overview of an embodiment.

FIG. 2 is a diagram illustrating a functional configuration of a vehicle speed control device according to the embodiment.

FIG. 3A is a diagram schematically illustrating a meter panel.

FIG. 3B is a diagram for illustrating a notification screen in a cruise control state.

FIG. 3C is a diagram for illustrating a notification screen in a case where a driver is controlling a speed of an own vehicle.

FIG. 4 is a flowchart of processing when being approached by a following vehicle.

FIG. 5 is a flowchart of processing in a case where a preceding vehicle is present.

DESCRIPTION OF EMBODIMENTS

Overview of Embodiment

An overview of a vehicle $V_a$ according to an embodiment will be described with reference to FIG. 1. FIG. 1 is a diagram for illustrating the overview of the embodiment. In FIG. 1, it is assumed that an own vehicle $V_a$, an overtaking target vehicle $V_b$ that the own vehicle $V_a$ is to overtake, a following vehicle $V_c$ that travels behind the own vehicle $V_a$, and a preceding vehicle $V_d$ that travels ahead of the own vehicle $V_a$ are traveling on a highway. With respect to speeds of respective vehicles, the own vehicle $V_a$ is at a speed $v_0$, the overtaking target vehicle $V_b$ is at a speed $v_1$, the following vehicle $V_c$ is at a speed $v_2$, and the preceding vehicle $V_d$ is a speed $v_3$.

In a case where the following vehicle $V_c$ approaches from behind quickly while the own vehicle $V_a$ is overtaking the overtaking target vehicle $V_b$, the own vehicle $V_a$ accelerates. Specifically, in a case where the following vehicle $V_c$ approaches within a predetermined rear-side distance before the own vehicle $V_a$ overtakes the overtaking target vehicle $V_b$, the own vehicle $V_a$ accelerates. The predetermined rear-side distance is a rear-side inter-vehicle distance that is maintained for safety between the own vehicle $V_a$ and the following vehicle $V_c$ that are in traveling. The rear-side inter-vehicle distance may be determined based on, for example, a speed of the own vehicle $V_a$, a speed of the following vehicle $V_c$, a road condition of a road on which the vehicle is traveling, or a surrounding environment such as weather. The rear-side inter-vehicle distance may be determined in advance as a predetermined value. For example, the rear-side inter-vehicle distance increases as the speed of the own vehicle $V_a$ decreases. For example, the rear-side inter-vehicle distance increases as the speed of the following vehicle $V_c$ increases.

Even in a case of being approached by the following vehicle $V_c$ quickly, the own vehicle $V_a$ does not accelerate when the preceding vehicle $V_d$ is traveling ahead. Specifically, before overtaking the overtaking target vehicle $V_b$, the own vehicle $V_a$ accelerates in a case where a distance between the own vehicle $V_a$ and the preceding vehicle $V_d$ does not reach a predetermined front-side distance, and does not accelerate in a case where the distance therebetween reaches the front-side distance. The predetermined front-side distance is a front-side inter-vehicle distance that is maintained for safety between the own vehicle $V_a$ and the preceding vehicle $V_d$ that are in traveling. The front-side inter-vehicle distance may be determined by, for example, a speed of the own vehicle $V_a$ or a speed of the preceding vehicle $V_d$. The front-side inter-vehicle distance may be determined in advance as a predetermined value. For example, the front-side inter-vehicle distance increases as the speed of the own vehicle $V_a$ increases.

In this way, the own vehicle $V_a$ accelerates in a case of being approached by the following vehicle $V_c$ quickly, and therefore deceleration of the following vehicle $V_c$ can be prevented. Further, even when the preceding vehicle $V_d$ is traveling ahead in a case of being approached by the following vehicle $V_c$ quickly, the own vehicle $V_a$ can accelerate while securing an inter-vehicle distance between the own vehicle $V_a$ and the preceding vehicle $V_d$.

The own vehicle $V_a$ decelerates after overtaking the overtaking target vehicle $V_b$. For example, after the own vehicle $V_a$ overtakes the overtaking target vehicle $V_b$, a driver of the own vehicle $V_a$ changes a lane from an overtaking lane to a traveling lane, and decelerates the own vehicle $V_a$ to a speed that is one before the acceleration of the own vehicle $V_a$, while the own vehicle $V_a$ is traveling in the traveling lane. In this way, the own vehicle $V_a$ can improve fuel efficiency of the own vehicle $V_a$.

<Configuration of Vehicle Speed Control Device According to Embodiment>

Hereinafter, a functional configuration of a vehicle speed control device 1 according to the embodiment will be described with reference to FIG. 2. FIG. 2 is a diagram illustrating the functional configuration of the vehicle speed control device 1 according to the embodiment. The vehicle speed control device 1 includes a sensor unit 10, a storage unit 11, and a control unit 12.

The sensor unit 10 is a sensor that detects an external environment of a vehicle V. The sensor unit 10 includes, for example, a camera that captures a front side, a camera that captures a rear side, and a millimeter wave radar. The sensor unit 10 may further include a laser radar, an ultrasonic sensor, or a global navigation satellite system (GNSS) sensor.

The storage unit 11 is, for example, a read only memory (ROM) or a random access memory (RAM). The storage unit 11 stores various programs for causing the control unit 12 to function. The storage unit 11 may store map information.

The control unit 12 is a calculation resource that includes a processor such as a central processing unit (CPU)(not illustrated). The control unit 12 implements functions of a front-side detection unit 121, a rear-side detection unit 122, a speed control unit 123, and a notification unit 124 by executing a program stored in the storage unit 11.

The front-side detection unit 121 detects the overtaking target vehicle $V_b$ that travels on a lateral side of the own vehicle $V_a$. For example, the front-side detection unit 121 detects the overtaking target vehicle $V_b$ by using an image captured by a camera that captures a front side and that is provided in the sensor unit 10. Specifically, the front-side detection unit 121 detects the overtaking target vehicle $V_b$ by using a pattern matching method. Incidentally, the present disclosure is not limited thereto, and a known recognition technique can be used. The front-side detection unit 121 detects a relative speed between the own vehicle $V_a$ and the overtaking target vehicle $V_b$ by analyzing a reflected wave of the millimeter wave radar generated with respect to the detected overtaking target vehicle $V_b$. The front-side detection unit 121 may obtain a distance between the own vehicle $V_a$ and the overtaking target vehicle $V_b$ by using the detected relative speed between the own vehicle $V_a$ and the overtaking target vehicle $V_b$.

The front-side detection unit 121 obtains a time it takes to overtake the overtaking target vehicle $V_b$ that travels on the lateral side of the own vehicle $V_a$ on which the vehicle speed control device 1 is mounted. Specifically, the front-side detection unit 121 obtains the time it takes to overtake the overtaking target vehicle $V_b$, which is determined based on the relative speed and the distance between the own vehicle $V_a$ and the overtaking target vehicle $V_b$. The time it takes to overtake the overtaking target vehicle v is time it takes for a position of the own vehicle $V_a$ to be ahead for a predetermined overtaking distance from the overtaking target vehicle $V_b$. The predetermined overtaking distance is an inter-vehicle distance that is maintained for safety between a vehicle and another vehicle that are in traveling, and is, for example, a length corresponding to an entire length of the own vehicle $V_a$. The front-side detection unit 121 may obtain a first time it takes to overtake the overtaking target vehicle $V_b$ at a speed obtained after the own vehicle $V_a$ is accelerated.

The front-side detection unit 121 may detect the preceding vehicle $V_d$ that travels ahead of the own vehicle $V_a$. For example, the front-side detection unit 121 obtains a relative speed between the own vehicle $V_a$ and the preceding vehicle $V_d$ that travels ahead of the own vehicle $V_a$ The front-side detection unit 121 may further obtain a distance between the own vehicle $V_a$ and the preceding vehicle $V_d$ by using the relative speed between the own vehicle $V_a$ and the preceding vehicle $V_d$. The front-side detection unit 121 may obtain a second time it takes for the distance between the own vehicle $V_a$ and the preceding vehicle $V_d$ to reach the predetermined front-side distance. The front-side detection unit 121 notifies the speed control unit 123 of the obtained time it takes to overtake the overtaking target vehicle $V_b$, the first time, and the second time.

The rear-side detection unit 122 obtains a time it takes for a distance between the own vehicle $V_a$ and the following vehicle $V_c$ traveling behind the own vehicle $V_a$ to be the predetermined rear-side distance. The rear-side detection unit 122 obtains a relative speed and the distance between the own vehicle $V_a$ and the following vehicle $V_c$ by using a method similar to that of the front-side detection unit 121. The rear-side detection unit 122 obtains the time it takes to reach the predetermined rear-side distance, which is determined based on the relative speed and the distance between the own vehicle $V_a$ and the following vehicle $V_c$. The rear-side detection unit 122 notifies the speed control unit 123 of the time it takes to reach the predetermined rear-side distance.

The speed control unit 123 controls the speed of the own vehicle $V_a$ by controlling an engine output or operating a brake, for example. For example, the speed control unit 123 accelerates the own vehicle $V_a$ in a case where the time it takes for the own vehicle $V_a$ to overtake the overtaking target vehicle $V_b$ is longer than the time it takes for the distance between the own vehicle $V_a$ and the following vehicle $V_c$ to be the predetermined rear-side distance. In this way, the vehicle speed control device 1 accelerates the own vehicle $V_a$ in the case of being approached by the following vehicle $V_c$ quickly, and therefore deceleration of the following vehicle $V_c$ can be prevented. The speed control unit 123 maintains the speed of the own vehicle $V_a$ in a case where the time it takes for the own vehicle $V_a$ to overtake the overtaking target vehicle $V_b$ is equal to or less than the time it takes for the distance between the own vehicle $V_a$ and the following vehicle $V_c$ to be the predetermined rear-side distance. In this way, the speed control unit 123 can prevent unnecessary acceleration.

The speed control unit 123 accelerates the own vehicle $V_a$ in a case where the speed obtained after the own vehicle $V_a$ is accelerated is lower than the speed of the preceding vehicle $V_d$ which is determined based on the relative speed between the own vehicle $V_a$ and the preceding vehicle $V_d$. As described, in the case where the speed obtained after the own vehicle $V_a$ is accelerated is lower than the speed of the preceding vehicle $V_d$, the distance between the own vehicle $V_a$ and the preceding vehicle $V_d$ never reaches the predetermined front-side distance, and therefore the speed control unit 123 accelerates the own vehicle $V_a$.

The speed control unit 123 may accelerate the own vehicle $V_a$ in a case where the first time is shorter than the second time. As described, in the case where the first time is shorter than the second time, the distance between the own vehicle $V_a$ and the preceding vehicle $V_d$ never reaches the predetermined front-side distance, and therefore the speed control unit 123 accelerates the own vehicle $V_a$.

The speed control unit 123 may decelerate the own vehicle $V_a$ after the overtaking target vehicle $V_b$ is overtaken. For example, the speed control unit 123 decelerates the own vehicle $V_a$ to a speed that is one before acceleration thereof, after the overtaking target vehicle $V_b$ is overtaken. For example, the speed control unit 123 decelerates the own vehicle $V_a$, when the own vehicle $V_a$ overtakes the overtaking target vehicle $V_b$ and the own vehicle $V_a$ moves from the overtaking lane to the traveling lane. As described, the speed control unit 123 decelerates the own vehicle $V_a$ when the own vehicle $V_a$ overtakes the overtaking target vehicle $V_b$, and therefore the fuel efficiency of the own vehicle $V_a$ can be improved.

Before the speed control unit 123 accelerates the own vehicle $V_a$, the notification unit 124 notifies the own vehicle $V_a$ that the following vehicle $V_c$ is approaching. For example, the notification unit 124 notifies the driver of the own vehicle $V_a$ that the own vehicle $V_a$ is accelerated. Specifically, the notification unit 124 notifies an instruction indicating acceleration, on a display unit 21 provided on a meter panel 2 of the own vehicle $V_a$. In this way, the driver of the own vehicle $V_a$ is able to know a reason for accelerating the own vehicle $V_a$, and therefore the vehicle speed control device 1 can reduce the uncomfortable feeling given to the diver.

A specific method of the notification unit 124 notifying the driver of accelerating the own vehicle $V_a$ will be described with reference to FIG. 3. FIGS. 3A to 3C are diagrams for illustrating notification screens. FIG. 3A is a diagram schematically illustrating the meter panel 2. The meter panel 2 includes the display unit 21. The display unit 21 is, for example, a liquid crystal display. The display unit 21 displays various types of information based on an instruction from the notification unit 124.

FIG. 3B is a diagram schematically illustrating a display screen displayed by the display unit 21. In FIG. 3B, a case is assumed where that the own vehicle $V_a$ is accelerated is notified in a so-called cruise control state in which the speed control unit 123 controls the speed of the own vehicle $V_a$. The notification unit 124 displays a display screen notifying that the following vehicle $V_c$ is approaching and that the own vehicle $V_a$ is accelerated. Specifically, the notification unit 124 notifies by displaying a set vehicle speed currently set and a vehicle speed obtained after temporary acceleration. As described, the notification unit 124 notifies the driver of the reason for accelerating the own vehicle $V_a$, and therefore the vehicle speed control device 1 can reduce the uncomfortable feeling given to the driver.

FIG. 3C is a diagram schematically illustrating another display screen displayed by the display unit 21. In FIG. 3C, it is assumed that the notification is performed in a case where the driver controls the speed of the own vehicle $V_a$.

The notification unit 124 notifies that the following vehicle $V_c$ is approaching, and displays a display screen for prompting acceleration of the own vehicle $V_a$. In this way, the vehicle speed control device 1 can enlighten the driver about safe driving.

The notification unit 124 may notify that the preceding vehicle $V_d$ is detected. For example, the notification unit 124 notifies the distance between the own vehicle $V_a$ and the preceding vehicle $V_a$ with an image indicating that the preceding vehicle $V_d$ is detected. In this way, the driver of the own vehicle $V_a$ can prevent the inter-vehicle distance between the own vehicle $V_a$ and the preceding vehicle $V_d$ from reaching the predetermined front-side distance.

The notification unit 124 may notify the distance between the own vehicle $V_a$ and the overtaking target vehicle $V_b$. The notification unit 124 may notify that the distance between the own vehicle $V_a$ and the overtaking target vehicle $V_b$ reaches a predetermined overtaking to distance. In this way, the driver of the own vehicle $V_a$ can confirm that the distance between the own vehicle $V_a$ and the overtaking target vehicle $V_b$ is equal to or more than the predetermined overtaking distance, and change the lane. After the overtaking target vehicle $V_b$ is overtaken and before the own vehicle $V_a$ is decelerated, the notification unit 124 may notify that the own vehicle $V_a$ is to be decelerated. In this way, the vehicle speed control device 1 can reduce the uncomfortable feeling given to the driver of the own vehicle $V_a$.

Hereinafter, a flow of processing of the own vehicle $V_a$ overtaking the overtaking target vehicle $V_b$ in a case where the following vehicle $V_c$ is approaching will be described with reference to FIG. 4. FIG. 4 is a flowchart of processing performed at the time when the following vehicle $V_c$ approaches. First, the front-side detection unit 121 obtains a time it takes for the own vehicle $V_a$ to overtake the overtaking target vehicle $V_b$ (step S1). The rear-side detection unit 122 obtains a time it takes for the following vehicle $V_c$ to catch up with the own vehicle $V_a$ (step S2). Specifically, the rear-side detection unit 122 obtains a time it takes for the distance between the own vehicle $V_a$ and the following vehicle $V_c$ traveling behind the own vehicle $V_a$ to be the predetermined rear-side distance.

The speed control unit 123 determines whether the time it takes for overtaking is longer than the time it takes for catching up (step S3). If it is determined that the time it takes for the overtaking is longer than the time it takes for the catching up (Yes in step S3), the speed control unit 123 accelerates the own vehicle $V_a$ (step S4). If it is determined that the time it takes for the overtaking is equal to or less than the time it takes for the catching up (No in step S3), the speed control unit 123 does not accelerate the own vehicle $V_a$ (step S5).

After accelerating the own vehicle $V_a$, the speed control unit 123 determines whether the own vehicle $V_a$ is traveling in the traveling lane after overtaking the overtaking target vehicle $V_b$ (step S6). If it is determined that it is not that the own vehicle $V_a$ is traveling in the traveling lane after overtaking the overtaking target vehicle $V_b$ (No in step S6), the speed control unit 123 stands by until it is determined that the own vehicle Va is traveling in the traveling lane after overtaking the overtaking target vehicle $V_b$ If it is determined that the own vehicle $V_a$ is traveling in the traveling lane after overtaking the overtaking target vehicle $V_b$ (Yes in step S6), the speed control unit 123 decelerates the own vehicle $V_a$ to a speed that is one before the acceleration thereof (step S7).

In the description of the flow of the processing in FIG. 4, the speed control unit 123 does not consider presence of the preceding vehicle $V_d$ Alternatively, the speed control unit 123 may determine whether to perform acceleration or not in consideration of the presence of the preceding vehicle $V_d$. Hereinafter, a flow of processing of the own vehicle $V_a$ overtaking the overtaking target vehicle $V_b$ in a case where the preceding vehicle $V_d$ is traveling will be described with reference to FIG. 5. FIG. 5 is a flowchart of processing in a case where the preceding vehicle $V_d$ is present.

First, the front-side detection unit 121 obtains a speed of the overtaking target vehicle $V_b$ (step S10). The rear-side detection unit 122 obtains a speed of and a distance of the following vehicle $V_c$ (step S11). The speed control unit 123 determines whether the following vehicle $V_c$ approaches before the overtaking target vehicle $V_b$ is overtaken (step S12). If it is determined that the following vehicle $V_c$ does not approach before the overtaking target vehicle $V_b$ is overtaken (No in step S12), the speed control unit 123 does not accelerate the own vehicle $V_a$ (step S17).

If it is determined that the following vehicle $V_c$ approaches before the overtaking target vehicle $V_b$ is overtaken (Yes in step S12), the speed control unit 123 determines whether the preceding vehicle $V_d$ is present (step S13). If it is determined that the preceding vehicle $V_d$ is not present (No in step S13), the speed control unit 123 accelerates the own vehicle $V_a$ (step S18). If it is determined that the preceding vehicle $V_d$ is present (Yes in step S13), the speed control unit 123 notifies the front-side detection unit 121 to obtain a speed and a distance of the preceding vehicle $V_a$ (step S14).

The speed control unit 123 determines whether a speed of the own vehicle $V_a$ after acceleration is higher than the speed of the preceding vehicle $V_d$ (step S15). If it is determined that the speed of the own vehicle $V_a$ after acceleration is equal to or lower than the speed of the preceding vehicle $V_d$ (No in step S15), the speed control unit 123 accelerates the own vehicle $V_a$ (step S18). If it is determined that the speed of the own vehicle $V_a$ after acceleration is higher than the speed of the preceding vehicle $V_d$ (Yes in step S15), the speed control unit 123 determines whether the own vehicle $V_a$ catches up with the preceding vehicle $V_a$ in a case where the own vehicle $V_a$ travels at the speed after acceleration (step S16). Specifically, the speed control unit 123 determines whether a distance between the own vehicle $V_a$ and the preceding vehicle $V_d$ is equal to or less than a predetermined preceding distance before the own vehicle $V_a$ overtakes the overtaking target vehicle $V_b$ at the speed after acceleration.

If it is determined that the own vehicle $V_a$ will catch up with the preceding vehicle $V_d$ in the case where the own vehicle $V_a$ travels at the speed obtained after acceleration (Yes in step S16), the speed control unit 123 does not accelerate the own vehicle $V_a$ (step S17). If it is determined that the own vehicle $V_a$ will not catch up with the preceding vehicle $V_d$ in the case where the own vehicle $V_a$ travels at the speed obtained after acceleration (No in step S16), the speed control unit 123 accelerates the own vehicle $V_a$ (step S18).

[Effect of Vehicle Speed Control Device 1 According to Embodiment]

As described above, the speed control unit 123 accelerates the own vehicle $V_a$ in a case where the time it takes for the own vehicle $V_a$ to overtake the overtaking target vehicle $V_b$ is longer than the time it takes for the distance between the own vehicle $V_a$ and the following vehicle $V_c$ to be the predetermined rear-side distance. In this way, the vehicle speed control device 1 can prevent the deceleration of the following vehicle $V_c$ even in a case of being approached by the following vehicle $V_c$ quickly. The speed control unit 123 maintains the speed of the own vehicle $V_a$ in a case where the time it takes to overtake the overtaking target vehicle $V_b$ is equal to or less than the time it takes to be the predetermined rear-side distance. In this way, the vehicle speed control device 1 can reduce unnecessary acceleration of the own vehicle $V_a$.

In a case where the preceding vehicle $V_d$ is traveling ahead of the own vehicle $V_a$, the speed control unit 123 accelerates the own vehicle $V_a$ when the speed of the own vehicle $V_a$ after acceleration is equal to or lower than the speed of the preceding vehicle $V_d$. In the case where the own vehicle $V_a$ travels at the speed after acceleration, the speed control unit 123 accelerates the own vehicle $V_a$ when the own vehicle $V_a$ will not catch up with the preceding vehicle $V_d$. In this way, the vehicle speed control device 1 can accelerate the own vehicle $V_a$ without the distance between the own vehicle $V_a$ and the preceding vehicle $V_a$ reaching the predetermined front-side distance.

The present disclosure has been described using the embodiment, but the technical scope of the present disclosure is not limited to the scope described in the embodiment described above, and various modifications and changes can be made within the scope thereof. For example, a specific embodiment of distributing and integrating devices is not limited to the above embodiment, and all or a part thereof may be configured to be functionally or physically distributed and integrated in any unit. New embodiments generated from any combination of a plurality of embodiments are also included in embodiments of the present disclosure. Effects of the new embodiments generated from the combinations include effects of the original embodiments.

The present application is based on a Japanese Patent Application (Japanese Patent Application No. 2017-195471) filed Oct. 5, 2017, the contents of which are incorporated herein by reference.

INDUSTRIAL APPLICABILITY

The present invention has an effect of being capable of preventing deceleration of a following vehicle at the time of overtaking an overtaking target vehicle, and is useful for a vehicle speed control device and a vehicle speed control method.

REFERENCE SIGNS LIST

1: Vehicle speed control device
2: Meter panel
10: Sensor unit
11: Storage unit
12: Control unit
21: Display unit
121: Front-side detection unit
122: Rear-side detection unit
123: Speed control unit
124: Notification unit

The invention claimed is:

1. A vehicle speed control device to be mounted on a vehicle, the vehicle speed control device comprising:
a control unit comprising a processor, the control unit being configured to:
obtain a time to overtake by an overtaking target vehicle that travels on a lateral side of an own vehicle on which the vehicle speed control device is mounted;
obtain a time it takes for a distance between the own vehicle and a following vehicle traveling behind the own vehicle to be a predetermined rear-side distance; and
accelerate the own vehicle in a case the time to overtake is longer than the time it takes to be the predetermined rear-side distance.

2. The vehicle speed control device according to claim 1, wherein, in the obtaining of the time to overtake, the control unit is configured to obtain the time to overtake based on a relative speed and a distance between the own vehicle and the overtaking target vehicle, and
wherein, in the obtaining of the time it takes to be the predetermined rear-side distance, the control unit is configured to obtain the time it takes to be the predetermined rear-side distance based on a relative speed and the distance between the own vehicle and the following vehicle.

3. The vehicle speed control device according to claim 1, wherein the control unit is further configured to:
notify that the following vehicle is approaching the own vehicle, before accelerating the own vehicle.

4. The vehicle speed control device according to claim 1, wherein, in the obtaining of the time to overtake, the control unit is further configured to obtain a relative speed between the own vehicle and a preceding vehicle traveling ahead of the own vehicle, and
wherein, in the accelerating the own vehicle, the control unit is configured to accelerate the own vehicle in a case a speed obtained after the own vehicle is accelerated is lower than a speed of the preceding vehicle which is determined based on the relative speed between the own vehicle and the preceding vehicle.

5. The vehicle speed control device according to claim 1, wherein, at a speed obtained after accelerating the own device, the controller is configured to obtain:
a first time it takes for the own vehicle to overtake the overtaking target vehicle; and
a second time it takes for a distance between the own vehicle and a preceding vehicle traveling ahead of the own vehicle to reach a predetermined front-side distance, and
wherein, in the accelerate the own vehicle, the control unit is configured to accelerate the own vehicle in a case the first time is shorter than the second time.

6. The vehicle speed control device according to claim 1, wherein, in the accelerate the own vehicle, the control unit is configured to decelerate the own vehicle to a speed that is one before accelerating the own vehicle, after overtaking the overtaking target vehicle.

7. A vehicle speed control method for a vehicle comprising a sensor and a controller, the sensor comprising a first sensor configured to detect an environment ahead of the vehicle and a second sensor configured to detect an environment behind the vehicle, the method comprising causing the controller to perform:
obtaining a first time to overtake by an overtaking target vehicle traveling on a lateral side of an own vehicle by using the first sensor;
obtaining a second time it takes for a distance between the own vehicle and a following vehicle traveling behind the own vehicle to be a predetermined rear-side distance by using the second sensor;
determining whether the first time is longer than the second time; and
accelerating the own vehicle in a case it is determined that the first time is longer than the second time.

8. The vehicle speed control method according to claim 7, wherein the method further causes the controller to perform:
  obtaining a relative speed between the own vehicle and a preceding vehicle traveling ahead of the own vehicle by using the first sensor;
  determining whether a speed obtained after the own vehicle is accelerated is lower than a speed of the preceding vehicle which is determined based on the relative speed between the own vehicle and the preceding vehicle; and
  accelerating the own vehicle in a case it is determined that the speed obtained after the own vehicle is accelerated is lower than the speed of the preceding vehicle.

9. A vehicle speed control device to be mounted on a vehicle, the vehicle speed control device comprising a control unit configured to:
  obtain a time to overtake by an overtaking target vehicle that travels on a lateral side of an own vehicle on which the vehicle speed control device is mounted;
  obtain a time it takes for a distance between the own vehicle and a following vehicle traveling behind the own vehicle to be a predetermined rear-side distance; and
  accelerate the own vehicle in a case the time to overtake is longer than the time it takes to be the predetermined rear-side distance.

* * * * *